(12) United States Patent
Sakai et al.

(10) Patent No.: US 8,624,457 B2
(45) Date of Patent: Jan. 7, 2014

(54) PERMANENT MAGNET ELECTRIC MOTOR

(75) Inventors: Kazuto Sakai, Kanagawa (JP); Yutaka Hashiba, Kanagawa (JP); Norio Takahashi, Yokohama (JP); Kazuaki Yuuki, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 369 days.

(21) Appl. No.: 13/130,206

(22) PCT Filed: Nov. 19, 2009

(86) PCT No.: PCT/JP2009/006216
§ 371 (c)(1),
(2), (4) Date: Jul. 26, 2011

(87) PCT Pub. No.: WO2010/058576
PCT Pub. Date: May 27, 2010

(65) Prior Publication Data
US 2012/0091848 A1 Apr. 19, 2012

(30) Foreign Application Priority Data
Nov. 19, 2008 (JP) ................................. 2008-296080

(51) Int. Cl.
*H02K 21/12* (2006.01)

(52) U.S. Cl.
USPC ............. 310/156.43; 310/156.38; 310/156.58

(58) Field of Classification Search
USPC ....................... 310/156.38–156.72
See application file for complete search history.

(56) References Cited

U.S. PATENT DOCUMENTS 6,177,745 B1 * 1/2001 Narita et al. ............. 310/156.43
6,229,239 B1 * 5/2001 Lucidarme et al. ........... 310/162

(Continued)

FOREIGN PATENT DOCUMENTS

JP 2002 252939 9/2002
JP 2006 280195 10/2006

(Continued)

OTHER PUBLICATIONS

International Search Report issued Feb. 9, 2010 in PCT/JP09/06216 filed Nov. 19, 2009.

(Continued)

*Primary Examiner* — Thanh Lam
(74) *Attorney, Agent, or Firm* — Oblon, Spivak, McClelland, Maier & Neustadt, L.L.P.

(57) ABSTRACT

An increase of the magnetization current can be prevented during demagnetization and magnetization, and a variable speed operation can be achieved at a high power output over a wide range of from a low speed to a high speed. A rotor (1) is configured by a rotor core (2), a variable magnetic force magnet (3) and a fixed magnetic force magnet (4). A variable magnetic force magnet (3) and a fixed magnetic force magnet (4*a*) are overlapped in the magnetization direction thereof to form a series of magnets. The series of magnets is located within the rotor core at a position where the magnetization direction is in the direction of a d-axis. On either side of the series of magnets of the variable magnetic force magnet (3) and the fixed magnetic force magnet (4*a*), fixed magnetic force magnets (4*b*, 4*b*) are located at a position where the magnetization direction is in the direction of the d-axis. When the flux linkage of the variable magnetic force magnet is reduced, a current of an armature coil allows a magnetic field to act in the reverse direction to the magnetization direction of the variable magnetic force magnet. When the flux linkage of the variable magnetic force magnet is increased, a current of the armature coil allows a magnetic field to act in the same direction as the magnetization direction of the variable magnetic force magnet.

17 Claims, 9 Drawing Sheets

(56) References Cited

U.S. PATENT DOCUMENTS

| | | | |
|---|---|---|---|
| 6,800,977 B1 | 10/2004 | Ostovic | |
| 7,550,889 B2 * | 6/2009 | Horst | 310/156.57 |
| 8,044,548 B2 | 10/2011 | Sakai et al. | |
| 2004/0124728 A1 * | 7/2004 | Yamaguchi et al. | 310/156.25 |
| 2007/0096578 A1 * | 5/2007 | Jahns et al. | 310/156.53 |
| 2007/0252468 A1 * | 11/2007 | Lee | 310/156.53 |
| 2008/0278021 A1 * | 11/2008 | Ley et al. | 310/156.38 |
| 2009/0261774 A1 | 10/2009 | Yuuki et al. | |
| 2010/0060223 A1 | 3/2010 | Sakai et al. | |
| 2010/0171385 A1 * | 7/2010 | Sakai et al. | 310/156.43 |
| 2010/0201294 A1 | 8/2010 | Yuuki et al. | |
| 2010/0327689 A1 | 12/2010 | Sakai et al. | |
| 2010/0327787 A1 | 12/2010 | Sakai et al. | |

FOREIGN PATENT DOCUMENTS

| | | |
|---|---|---|
| JP | 2008 048514 | 2/2008 |
| JP | 2008 245368 | 10/2008 |
| WO | 2008 013167 | 1/2008 |

OTHER PUBLICATIONS

U.S. Appl. No. 13/000,227, filed Mar. 24, 2011, Sakai et al.

* cited by examiner

Flux linkage: maximum (start)

Generation of a magnetic field to reduce the magnetic
force of the variable magnetic force magnet

FIG. 4

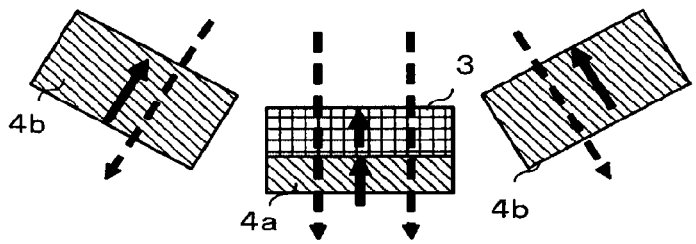

Reduction of the magnetic force of the variable magnetic force magnet due to a reverse magnetic field

FIG. 5

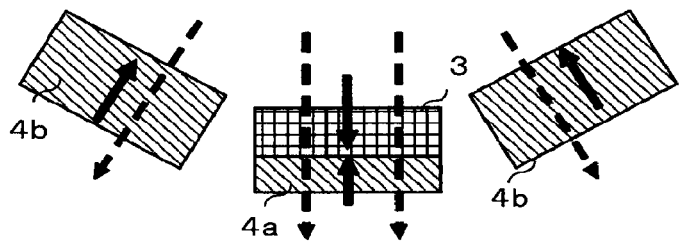

Magnetization in the reverse direction of the variable magnetic force magnet due to a reverse magnetic field (reversal of the polarity)

Flux linkage: minimum

FIG. 6

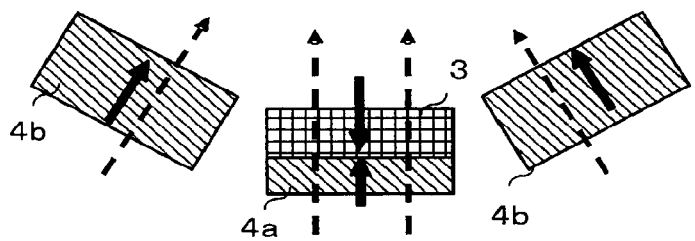

Generation of a magnetic field to reduce the magnetic force of the variable magnetic force magnet after reversal of the polarity Reduction of the magnetic force of the variable magnetic force magnet due to a magnetic field after reversal of the polarity Magnetization in the reverse direction of the variable magnetic force magnet due to a reverse magnetic field (further reversal of the polarity)

Flux linkage: maximum

Cange of working point of variable magnetic force magnet and magnetic characteristics of typical magnets FIG. 16
(A)
(B)
(C)
(D)
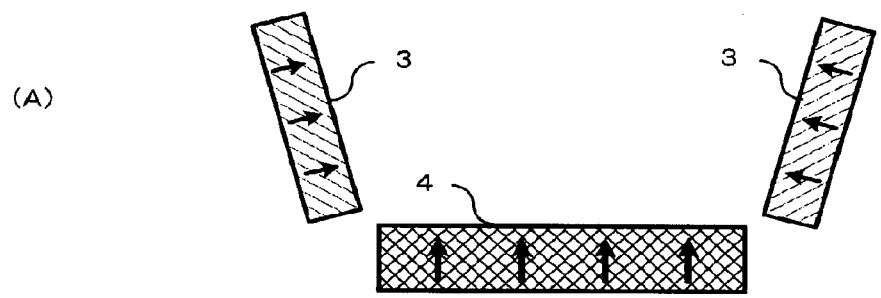
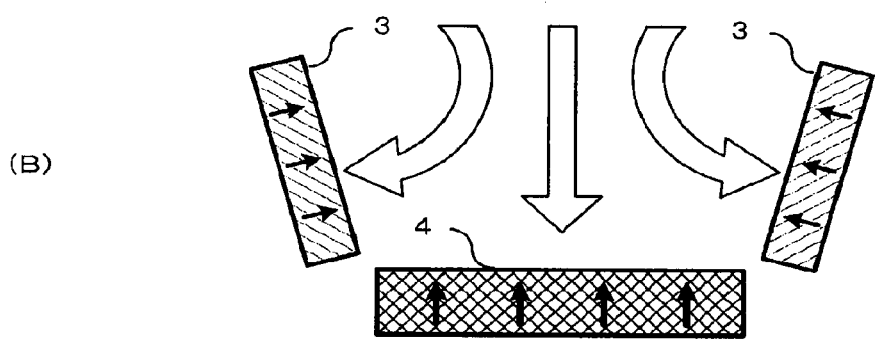
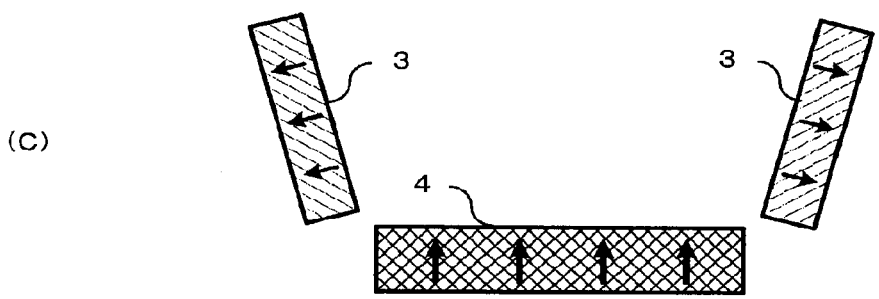
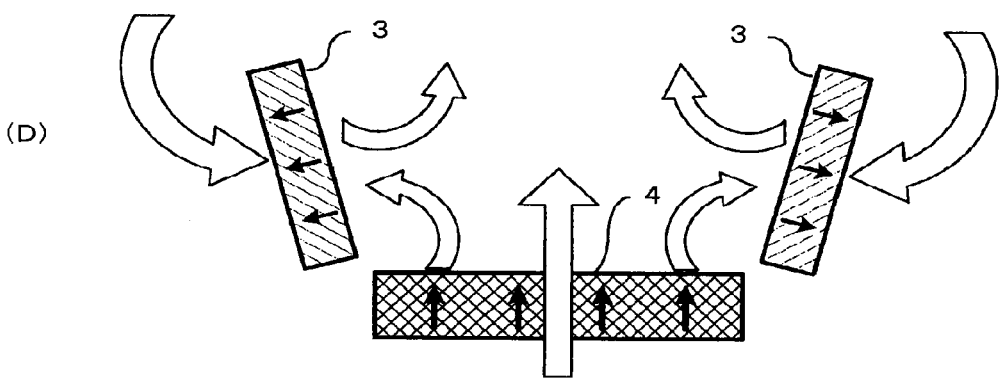

PERMANENT MAGNET ELECTRIC MOTOR

FIELD

This invention relates to a permanent magnet electric motor in which two or more types of permanent magnets are engaged and the magnetic flux of at least one of the permanent magnets is changed quantitatively and irreversibly so that a variable speed operation is achieved over a wide range of from a low speed to a high speed.

BACKGROUND

In general, permanent magnet electric motors are broadly classified into two categories, that is, "surface permanent magnet motor" in which a permanent magnet is attached on the outer part of a rotor core, and "interior permanent magnet motor" in which a permanent magnet is embedded in a rotor core. Among these, the "interior permanent magnet motor" is suitable for use as a variable speed drive motor.

In a permanent magnet electric motor, the flux linkage of a permanent magnet is constantly generated at a uniform strength, as a result, an induced voltage due to the permanent magnet increases in proportion to the rotational speed. Consequently, during a variable speed operation from a low speed to a high speed, a high speed rotation causes a very high induced voltage (counter electromotive voltage) due to the permanent magnet. If the induced voltage due to the permanent magnet is applied to an electronic component of an inverter and increases up to equal to or more than the withstand voltage thereof, the electronic component results in dielectric breakdown. For avoiding such a result, a design is considered, in which the magnetic flux of a permanent magnet is reduced such that an induced voltage due to a permanent magnet is equal to or less than the withstand voltage of an electronic component of an inverter, but this design causes a reduction of output and efficiency in a low speed range of the permanent magnet electric motor.

During a variable speed operation approximating to constant output from a low speed to a high speed, the flux linkage of a permanent magnet is generated uniformly, in a high speed rotation range, the voltage of the motor reaches the upper limit of the power supply voltage and the current required for output is not to flow. As a result, in the high speed rotation range, the output is reduced significantly, and furthermore, a variable speed operation can not be performed over a wide range up to a high speed rotation Recently, "flux weakening control", which is described in various documents, has come to be applied to a method for enlarging the variable speed range. The total flux linkage quantity of an armature coil is determined from the magnetic flux due to a d-axis current and the magnetic flux due to a permanent magnet thereof. In the "flux weakening control", a magnetic flux is generated by a minus d-axis current, and this flux due to the minus d-axis current causes reduction of the total flux linkage quantity. Further, in the "flux weakening control", a permanent magnet with a high coercivity is adopted such that a working point of a magnetic characteristic (B—H characteristic) may change in the reversible range. Consequently, an NdFeB magnet with a high coercivity is applied to that of a permanent magnet electric motor such that the permanent magnet is irreversibly demagnetized by a demagnetizing field under the "flux weakening control".

In operations applying the "flux weakening control", the flux due to the minus d-axis current causes reduction of the flux linkage quantity, as a result, the reduced quantity of flux linkage generates a voltage to spare in relation to the upper limit voltage. An electric current to be a torque component increases, as a result, the output of a high speed range increases. In addition, the rotational speed increases in proportion to the voltage to spare, and this enlarges the range of the variable speed operation.

However, since a minus d-axis current does not contribute to the output, causing the minus d-axis current to flow constantly results in that the copper loss increases and the efficiency is deteriorated. Further, the demagnetizing field due to the minus d-axis current generates a harmonic flux, and increase of voltage due to the harmonic flux or the like makes a limit of voltage reduction due to the "flux weakening control". For these reasons, even if "flux weakening control" is applied to an "interior permanent magnet motor", it is impossible to perform a variable speed operation more than three times of a base speed. Further, there is a problem that the harmonic flux as described above causes an increase of iron loss and a substantial reduction of efficiency in a low and middle speed range. In addition, there is a possibility of generating a vibration as a result of electromagnetic force due to the harmonic flux.

When an "interior permanent magnet motor" is applied to a motor for driving a hybrid car, the motor is forced to operate in a state of engine drive only. In a middle and high speed rotation, an induced voltage of the motor due to a permanent magnet rises, for restraining the induced voltage to be equal to or less than the power supply voltage, a minus d-axis current is allowed to flow constantly by the "flux weakening control". In this state, the motor generates only loss, as a result, an overall operating efficiency deteriorates.

When an "interior permanent magnet motor" is applied to a motor for driving an electric train, since the electric train runs by inertia at a state, as with the application to a motor for driving a hybrid car as described above, for restricting an induced voltage of the motor due to a permanent magnet to be equal to or less than the power supply voltage, a minus d-axis current is allowed to flow constantly by the "flux weakening control". In this case, the motor generates only loss, as a result, an overall operating efficiency deteriorates.

As a technique for solving these problems, in Patent Document 1 and Patent Document 2, a technique is described, which arranges permanent magnets (called "variable magnetic force magnet" below) with a low coercivity such as to change magnetic flux density irreversibly due to a magnetic field generated by a stator coil, and permanent magnets (called "fixed magnetic force magnet" below) with a high coercivity that is equal to or more than twice as much as that of the variable magnetic force magnet, and adjusts the total flux linkage quantity by magnetizing the variable magnetic force magnet by magnetic fields due to current such that the total flux linkage due to the variable magnetic force magnet and the fixed magnetic force magnet is reduced in a high speed rotation range in which the voltage is equal to or more than the maximum voltage of the power supply voltage.

A permanent magnet electric motor of Patent Document 1, has a rotor 1 that is configured as shown in FIG. 15. Here, the rotor 1 is configured by a rotor core 2, eight variable magnetic force magnets 3 and eight fixed magnetic force magnets 4. The rotor core 2 is configured by layering silicon steel plates, the variable magnetic force magnets 3 are Al—Ni—Co magnets or FeCrCo magnets, and the fixed magnetic force magnets 4 are NdFeB magnets.

The variable magnetic force magnets 3 are embedded in the rotor core 2, and first type of cavities 5 each are provided at the opposite ends of the variable magnetic force magnets 3. The variable magnetic force magnets 3 each are arranged along with the radial direction of the rotor that matches the q-axis as a center axis between magnetic poles, and magnetized in the orthogonal direction to the radial direction. The fixed magnetic force magnets 4 are embedded in the rotor core 2, and second type of cavities 6 each are provided at the opposite ends of the fixed magnetic force magnets 4. The fixed magnetic force magnets 4 each are arranged approximately along with the round of the rotor 1 such that the fixed magnetic force magnets 4 each are put between two variable magnetic force magnets 3 on the inner side of the rotor 1. The fixed magnetic force magnets 4 each are magnetized in the orthogonal direction to the round of the rotor 1.

The magnetic pole parts 7 of the rotor core 2 each are formed such that they are surrounded by two variable magnetic force magnets 3 and one fixed magnetic force magnet 4. The center axis of the magnetic poles 7 is d-axis, and the center axis between each two magnetic poles 7 is the q-axis. In the permanent magnet electric motor of Patent Document 1 which adopts this rotor 1, a pulse-like current is allowed to flow through the stator coil in an extremely short conductive time (about 100 μs to 1 ms) to form a magnetic field, and thereby the magnetic field acts on the variable magnetic force magnet 3. When a magnetizing magnetic field is 250 kA/m, ideally, sufficient magnetizing magnetic field acts on the variable magnetic force magnet 3, and the fixed magnetic force magnet 4 is not irreversibly demagnetized due to the magnetization.

As a result of this, with the permanent magnet electric motor of Patent Document 1, the flux linkage of the variable magnetic force magnets 3 changes from the maximum value to zero, and magnetization can be made in the two directions of forward and reverse. In other words, if the flux linkage of the fixed magnetic force magnets 4 is directed in a forward direction, the flux linkage of the variable magnetic force magnets 3 can be adjusted in a range of from the maximum value of the forward direction to zero, and furthermore, over a wide range up to the maximum value of the reverse direction. Consequently, in the rotor 1 of Patent Document 1, the variable magnetic force magnets 3 are magnetized by a d-axis current, as a result, the total flux linkage quantity can be adjusted over a wide range, which is obtained by summing up that of the variable magnetic force magnets 3 and that of the fixed magnetic force magnets 4.

For example, in a low speed range, when the variable magnetic force magnets 3 are magnetized by a d-axis current such that the flux linkage of the variable magnetic force magnets 3 shows the maximum value in the same direction (in a initial state) of the flux linkage of the fixed magnetic force magnets 4, the torque due to the permanent magnets reaches the maximum value, and this allows the torque and output of the motor to be the maximum. In a middle and high speed range, when the magnetic flux is reduced and the total flux linkage quantity is reduced, the voltage of the motor is reduced, and this generates a voltage to spare in relation to the upper limit of the power supply voltage, and allows the rotation speed (frequency) to be higher.

Patent Document 1: Japanese Patent Application Laid-open No. 2006-280195
Patent Document 2: Japanese Patent Application Laid-open No. 2008-48514
Non-patent Document: "Design and control of embedded magnet synchronous motor", Yoji Takeda et al., Ohmsha, Ltd., October 2001, ISBN: 4-274-03567-0

The permanent magnet electric motor of Patent Document 1 which is configured as described above, has an excellent characteristics that the flux linkage quantity of the variable magnetic force magnets 3 changes over a wide range of from the maximum value to zero by a d-axis current of the rotor 1, and that and magnetization can be made in the two directions of forward and reverse. On the other hand, a large magnetization current is required when magnetizing the variable magnetic force magnets 3, this allows an inverter for driving the motor to be enlarged.

In particular, in view of characteristics of permanent magnets, a large magnetization current is required when magnetization compared with when demagnetization. However, since the permanent magnet electric motor of Patent Document 1 has a configuration in which two types of magnets are arranged magnetically in parallel, by the influence of the flux linkage of the fixed magnetic force magnets 4, a large magnetic field is required for magnetization of the variable magnetic force magnets 3.

FIGS. 16(A) to 16(D) are schematic diagrams illustrating this. In the permanent magnet electric motor of Patent Document 1, as shown in FIG. 16(A), two variable magnetic force magnets 3 and one fixed magnetic force magnet 4 are arranged in a U-shape such that d-axis is center of the U-shape. When the motor is operating in a normal state, the flux of the variable magnetic force magnets 3 and the fixed magnetic force magnet 4 is directed in the direction of the center magnetic pole part 7. In this state, when a d-axis current flows in pulse-like to generate a magnetic field for demagnetization, the flux of the magnetic field is generated such that the flux penetrates the variable magnetic force magnets 3 and the fixed magnetic force magnet 4 from the outer side of the rotor 1, as shown in FIG. 16(B), resulting in that the variable magnetic force magnets 3 are demagnetized. In this case, since the fixed magnetic force magnet 4 has a high coercivity, the magnet 4 is not demagnetized.

During the demagnetization process, as shown in FIG. 16(B), the flux of the fixed magnetic force magnet 4 flows in the d-axis direction and in the direction of going from the inner side to outer side of the variable magnetic force magnets 3, that is, in the reverse direction of an initial direction of the flux of the variable magnetic force magnets 3, thereby the fixed magnetic force magnet 4 assists the demagnetization due to a magnetic field generated by a d-axis current. Consequently, as shown in FIG. 16(*c*), the demagnetization can be made up to the reversal of the polarity of the variable magnetic force magnets 3.

On the other hand, in a magnetization process, a d-axis current is applied in pulse-like again, as shown in FIG. 16(D), a magnetic field is generated in the reverse direction to that of FIG. 16(B), the flux in the reverse direction which configures the magnetic field, restores the flux linkage of the demagnetized variable magnetic force magnets 3 to the state of a normal operation of FIG. 16(*a*). However, essentially, a large energy is required for the magnetization compared with the demagnetization, in addition to this, as shown in FIG. 16(D), the flux of the fixed magnetic force magnet 4 is applied to the variable magnetic force magnets 3 in the direction of demagnetizing the variable magnetic force magnets 3, as a result, a large magnetization currant is required, which can generate a large magnetic field to overcome this.

As described above, in the permanent magnet electric motor of Patent Document 1, since the two types of magnets are arranged magnetically in parallel, there are merits such as a large magnetization of the variable magnetic force magnets 3 and increase of the variation of the magnetic force such as from zero to 100%, but there is a demerit in which a large magnetization currant is required for a magnetization process.

The demerit as described above, is not limited to the magnetization process, and occurs not a little when demagnetizing the variable magnetic force magnets 3. What is desired is a permanent magnet electric motor which allows the magnetic flux of the variable magnetic force magnet 3 to be changed efficiently.

This invention is proposed to solve the problems described above, and has as an object the provision of a permanent magnet electric motor which can reduce a magnetization current when magnetizing variable magnetic force magnets, thereby which, without enlarging an inverter, can perform a variable speed operation over a wide range of from a low speed to a high speed, as a result, which can contribute to a high torque in a low speed rotation range, a high power output in a middle and high speed rotation range, and an improvement of efficiency.

SUMMARY

In order to attain the above object, as one aspect of this invention, a permanent magnet electric motor is provided, in which a rotor is configured by a rotor core and a plurality of magnetic poles formed inside the rotor core by using two or more types of permanent magnets selected such that the product of the coercivity and the thickness in the magnetization direction of each magnet is different from each other, in which a stator is located outside the rotor with an air gap intervening between them and configured by an armature core and an armature coil. This permanent magnet electric motor has the following technical features. Here, in the two or more types of permanent magnets, one type of permanent magnet has a smaller value as the product of the coercivity and the thickness in the magnetization direction compared with any other type of permanent magnet within the rotor core is called "permanent magnet of small product type", and another type of permanent magnet has a larger value as the product of the coercivity and the thickness in the magnetization direction compared with any other type of permanent magnet within the rotor core is called "permanent magnet of large product type". When using the terms, the plurality of magnetic poles configured by a series of magnets, which is formed by two or more permanent magnets including the two or more types of permanent magnets located in series in a magnetic circuit, and a permanent magnet of the large product type located in parallel to the series of magnets in a magnetic circuit. In this permanent magnet electric motor, a permanent magnet of the small product type in permanent magnets forming the series of magnets is magnetized by a magnetic field generated by a current of the armature coil so that the magnetic flux of the permanent magnet configuring the magnetic pole is changed quantitatively and irreversibly.

As another aspect of this invention, two or more types of permanent magnets may be located in series or parallel in a magnetic circuit within each magnetic pole of the rotor, or two or more types of permanent magnets may be located in series or parallel in a magnetic circuit over a plurality of magnetic poles. In addition, for each magnetic pole, a magnetic barrier or a short-circuit coil may be provided.

By means of the permanent magnet electric motor according to this invention, when demagnetizing and magnetizing the permanent magnet of the small product type in relation to the product of the coercivity and the thickness in the magnetization direction, it is possible to prevent increase in a magnetization current. This can contribute to an improvement of efficiency in the motor.

BRIEF DESCRIPTION OF THE DRAWINGS

FIG. 4 is a sectional view showing a state in which a reverse magnetic field due to a current has reduced the magnetic force of the variable magnetic force magnet;

FIG. 5 is a sectional view showing a state in which a reverse magnetic field due to a current has magnetized the variable magnetic force magnet in the reverse direction, and the flux linkage of the magnets is a minimum level;

FIG. 6 is a sectional view showing a state in which a current of a coil has generated a magnetic field that reduces the magnetic force of the variable magnetic force magnet reversed in polarity;

FIG. 16 is a schematic diagram showing an action of the rotor described in Patent Document 1.

DETAILED DESCRIPTION

Below, embodiments of permanent magnet electric motor according to this invention are explained referring to FIG. 1 to FIG. 12. Note that the following embodiments are explained regarding a case of 12 pole motor, but this invention can be similarly applied to various motors having another number of poles.

{First Embodiment}
{Configuration}

Figure 1:
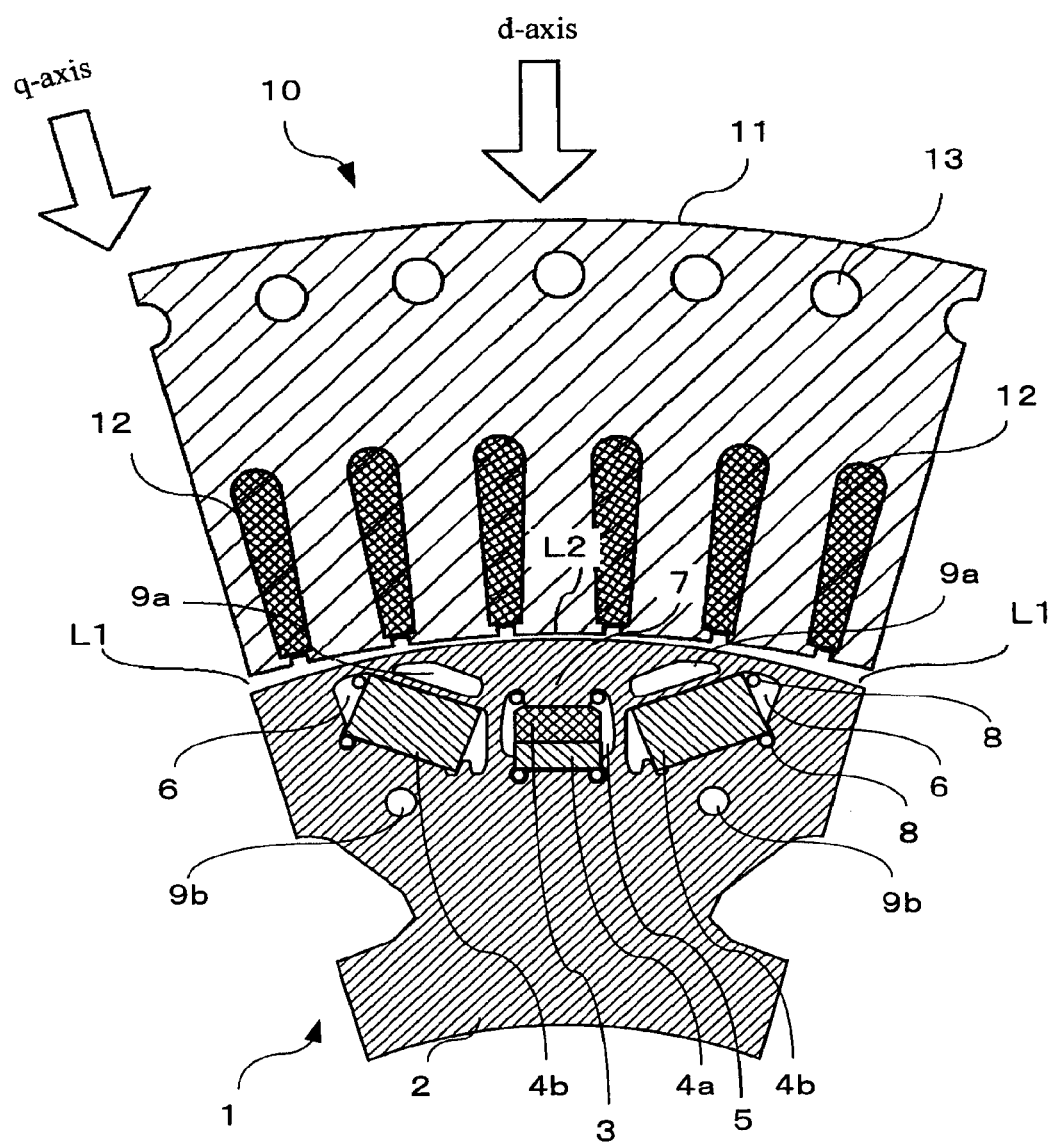
FIG. 1 is a sectional view showing a rotor and a stator in a first embodiment of the invention.

A first embodiment of this invention is explained referring to FIG. 1.

In the first embodiment of this invention, as shown in FIG. 1, a rotor 1 is configured by a rotor core 2, permanent magnets 3 (as "variable magnetic force magnet" below) having a small value as the product of the coercivity and the thickness in the magnetization direction thereof, and permanent magnets 4a, 4b (as "fixed magnetic force magnet" below) having a large value as the product of the coercivity and the thickness in the magnetization direction thereof. Here, the symbol "4a" denotes one fixed magnetic force magnet that is arranged in series to the variable magnetic force magnet 3 in a magnetic circuit. The symbol "4b" denotes two fixed magnetic force magnets that are arranged in parallel to the variable magnetic force magnet 3. The rotor core 2 is configured by layering silicon steel plates, and the variable magnetic force magnet 3 and the fixed magnetic force magnet 4a, 4b are embedded in the rotor core 2.

Cavities 5, 6 are provided at the opposite ends of the variable magnetic force magnet 3 and the fixed magnetic force magnets 4a, 4b, respectively, such that a magnetic flux passing through the rotor core 2, passes through the variable magnetic force magnet 3 and the fixed magnetic force magnets 4a, 4b in the thickness direction thereof. A magnetic pole part 7 is formed such that the magnetic pole part is surrounded by the one variable magnetic force magnet 3 and the three fixed magnetic force magnets 4a, 4b, 4b. The central axis of the magnetic pole part 7 within the rotor core 2 is a d-axis, and the central axis of an interval between the magnetic poles is a q-axis.

Ferrite magnets or Al—Ni—Co magnets may be used as the variable magnetic force magnet 3. NdFeB magnets may be used as the fixed magnetic force magnets 4a, 4b. In this embodiment, an example, in which a ferrite magnet with a coercivity of 280 kA/m is used as the variable magnetic force magnet 3 and NdFeB magnets with a coercivity of 1,000 kA/m is used as the fixed magnetic force magnets 4a, 4b, is explained.

The variable magnetic force magnet 3 and the fixed magnetic force magnets 4a are provided to overlap each other in the magnetization direction to form one magnet. In other words, the variable magnetic force magnet 3 and the fixed magnetic force magnets 4a are arranged to magnetically overlap each other in series in the same magnetization direction to form a series of magnets. The series of magnets are located inside the rotor core 2 at a position where the magnetization direction thereof is a d-axis direction (here, approximately radial direction of the rotor). On the other hand, on either side of the series of magnets formed by the variable magnetic force magnet 3 and the fixed magnetic force magnet 4a, the fixed magnetic force magnets 4b, 4b are arranged at a position where the magnetization direction thereof is the d-axis direction. These fixed magnetic force magnets 4b, 4b on either side, configure a parallel circuit to the series of magnets in a magnetic circuit. In other words, in the magnetic circuit, the fixed magnetic force magnet 4a is arranged in series to the variable magnetic force magnet 3 and the fixed magnetic force magnets 4b, 4b are parallel to the variable magnetic force magnet 3. In addition, cavities 9a, 9b are provided in the outside and inside of the fixed magnetic force magnets 4b, 4b within the rotor core 2. Here, the cavity 9a in the outer part of the fixed magnetic force magnets 4b, 4b is extended in the arrangement direction of the fixed magnetic force magnets 4b, 4b, to form a magnetic barrier.

Short circuit coils 8 are provided on the top side (on the outer side of the rotor) and the bottom side (on the inner side of the rotor) of the magnets 3, 4a, 4b such that they each surround the series of magnets having overlapping layers of the variable magnetic force magnet 3 and the fixed magnetic force magnets 4a, and the fixed magnetic force magnets 4b, 4b on either side. The short circuit coil 8 is arranged such that the central axis of the circuit coil is in the magnetization direction of the fixed magnetic force magnets 4b, 4b. Each short circuit coil 8 is made of a ring-shaped conductive member, and fixed such that the short circuit coil 8 is inserted in an edge part of the cavity 5, 6 provided in the rotor core 2. Note that the short circuit coil 8 also can be produced by allowing a conductive material to flow and be melted by a high temperature in a hole of the rotor core 2 to cast a coil. The short circuit coil 8 is provided in a magnetic path part of the other fixed magnetic force magnets 4b, 4b except the variable magnetic force magnet 3.

The short circuit coil 8 generates a short circuit current using a magnetic flux generated when conduction of a d-axis current through an armature coil is performed.

It is preferable that a short circuit current flowing through the short circuit coil 8, flows within one second, at such intensity as to change a magnetization of the permanent magnet 3 to be irreversibly changed, subsequently, the short circuit current is attenuated by more than 50% within one second. In addition, when an inductance value and a resistance value of the short circuit coil 8 are set such that a short circuit current flows, which is such as to change a magnetization of the variable magnetic force magnet 3 to be irreversibly changed, the efficiency can be improved.

A stator 10 is provided outside the rotor core 2 with an air gap intervening between them. The stator 10 has an armature core 11 and armature coils 12. In FIG. 1, symbol "13" denotes a cavity provided in the outer part of the armature core 11. A magnetization current flowing through the armature coil 12 induces an induced current in the short circuit coil 8, as a result, the induced current forms a magnetic flux passing through the short circuit coil 8. In addition, a magnetization current that flows through the armature coil 12 causes to irreversibly change the magnetization direction of the variable magnetic force magnet 3.

In more detail, with regard to the variable magnetic force magnet 3 and the fixed magnetic force magnet 4a, during an operation of the permanent magnet electric motor, a magnetic field due to a d-axis current causes to magnetize the variable magnetic force magnet 3 to quantitatively and irreversibly change the magnetic flux of the variable magnetic force magnet 3. In this case, a q-axis current controls the torque of the motor while a d-axis current, which magnetizes the variable magnetic force magnet 3, is allowed to flow.

In addition, a magnetic flux due to a d-axis current causes to quantitatively and irreversibly change a flux linkage of the armature coil 12 generated by the variable magnetic force magnet 3 and the fixed magnetic force magnets 4a, 4b and an electric current (all electric current as a result of synthesizing a q-axis current and d-axis current), that is, a flux linkage of the whole armature coil 12, which includes a magnetic flux generated in the armature coil by all electric current of the motor, and a magnetic flux generated by two or more types of permanent magnets 4a, 4b within the rotor.

In particular, in this embodiment, a magnetic field due to an instant and large d-axis current causes to irreversibly change the variable magnetic force magnet 3. An operation is performed in this state by allowing a d-axis current to flow continuously within a range that causes an irreversible demagnetization of approximately zero or a little quantity. In such an operation, the d-axis current acts such as to advance a current phase to adjust the terminal voltage.

In addition, an operation control method is performed for reversing the polarity of the changeable magnet 3 using a large d-axis current to advance a current phase. In this way, since a large d-axis current causes a reversal of the polarity of the variable magnetic force magnet 3, even if a minus d-axis current, which is to reduce the terminal voltage, flows, a magnetic field due to the minus d-axis current acts as not a demagnetizing field but a magnetizing field for the variable magnetic force magnet 3. Consequently, such a minus d-axis current, without demagnetizing the variable magnetic force magnet 3, can contribute to adjustment of the terminal voltage value.

In general magnet motors, since the polarity of a magnet is not reversed, if advancing a current phase to increase a d-axis current, there would be a problem that the magnet is irreversibly demagnetized. On the other hand, in this embodiment, when reversing the polarity of the variable magnetic force magnet 3, it is possible to advance a current phase.

{Basic Action}

Next, action of this embodiment is explained.

In this embodiment, a pulse-like current is allowed to flow through the armature coil 12 of the stator 10, in an extremely short conductive time (of the order of 0.1 ms to 100 ms), to generate a magnetic field, as a result, the generated magnetic field acts the variable magnetic force magnet 3. Here, a pulse current that generates the magnetic field for magnetizing the variable magnetic force magnet, is assumed to be a d-axis current component of the armature coil 12 of the stator 10.

If the thickness of the two types of permanent magnets 3, 4a, 4b is approximately uniform, a range, in which the magnetization state of one type of permanent magnet is changed by an active magnetic field due to a d-axis current, is changed in accordance with the coercivity. That is, the change of the magnetization state of one type of permanent magnet due to an active magnetic field is estimated by calculating the product of the coercivity and the thickness in the magnetization direction of the permanent magnet. In this embodiment, it is assumed that the ferrite magnet has a coercivity of 300 kA/m and the NdFeB magnet has a coercivity of 1,000 kA/m. The thickness in the magnetization direction is 5 mm in common between the magnets. The magnetomotive force required for the magnetization is estimated by calculating the magnetic field and the thickness of the permanent magnet. Since the 90% magnetizing magnetic field of the ferrite magnet is approximately 350 kA/m, the magnetomotive force required for the magnetization is $350(kA/m) \times 5 \times 10^{-3} = 1,750(A)$. On the other hand, since the 90% magnetizing magnetic field of the NdFeB magnet is approximately 1,500 kA/m, the magnetomotive force required for the magnetization is $1,500(kA/m) \times 5 \times 10^{-3} = 7,500(A)$.

The magnetomotive force required for changing the magnetic force of the ferrite magnet as variable magnetic force magnet 3, is approximately 20% of the NdFeB magnet as fixed magnetic force magnets 4a, 4b. Consequently, an electric current that allows the magnetic force of the ferrite magnet to be variable, also allows maintain the magnetic force of the NdFeB magnet without allowing it to change. Therefore, when a series of magnets is formed by combining these magnets in series, the magnetic force of the NdFeB magnet is maintained as a base part and the magnetic force of the ferrite magnet is allowed to be changed, the total flux linkage of the permanent magnets can be adjusted.

First, using a minus d-axis current that generates a magnetic field in the reverse direction to the magnetization direction of the permanent magnet, conduction of a pulse-like current that flows through the armature coil is performed. If the magnetic field within the magnet, which has been changed by the minus d-axis current, has reached a value of 175 kA/m, since the coercivity of the ferrite magnet is 175 kA/m, then the magnetic force of the ferrite magnet is irreversibly and significantly reduced. On the other hand, since the coercivity of the NdFeB magnet is 1,500 kA/m, the magnetic force of the NdFeB magnet is not irreversibly reduced. As a result, when a pulse-like d-axis current has reached a value of zero, since only the ferrite magnet has reached a demagnetized state, the flux linkage due to the whole magnets can be quantitatively reduced.

Next, using a plus d-axis current that generates a magnetic field in the same direction as the magnetization direction of the permanent magnet, conduction of a pulse-like current that flows through the armature coil is performed. A magnetic field required for magnetizing the ferrite magnet is allowed to be generated. If the magnetic field within the magnet, which has been changed by the plus d-axis current, has reached a value of 350 kA/m, the ferrite magnet, which was demagnetized, has been magnetized to generate a maximum magnet force. On the other hand, since the coercivity of the NdFeB magnet is 1,500 kA/m, the magnetic force of the NdFeB magnet is not irreversibly reduced. As a result, when a pulse-like plus d-axis current has reached a value of zero, since only the ferrite magnet has reached a magnetized state, the flux linkage due to the whole magnets can be quantitatively increased. This allows the flux linkage to be restored to the original maximum flux linkage.

As described above, an instant magnetic field due to a d-axis current acts on the ferrite magnet and the NdFeB magnet, to irreversibly change the magnetic force of the ferrite magnet, as a result, it is possible to quantitatively and voluntarily change the total flux linkage of the permanent magnets.

Here, during the operation at the maximum torque in a low-speed rotation range of the permanent magnet electric motor, the variable magnetic force magnet 3 is magnetized so as to add up and increase the magnetic flux of the permanent magnets within the magnetic pole. During a light loaded operation at a small torque and in a middle-speed rotation range and a high-speed rotation range, a magnetic field generated by a current allows the variable magnetic force magnet 3 to be magnetized so as to reduce the total flux linkage. In addition, when the permanent magnet of the magnetic pole has been changed irreversibly and the flux linkage has been minimum, and when the rotor has reached the maximum rotation speed, an induced voltage generated by the permanent magnet is allowed to be equal to or less than the withstand voltage of an electronic component of an inverter that is a power source of the motor.

{Action of Series Arrangement}

In this embodiment, since two types of magnets are arranged in series in a magnetic circuit to form a series of magnets, when demagnetizing and magnetizing the variable magnetic force magnet 3, an action of the permanent magnet electric motor is different from that of Patent Document 1. This point is explained referring to FIG. 2 to FIG. 8.

Figure 2:
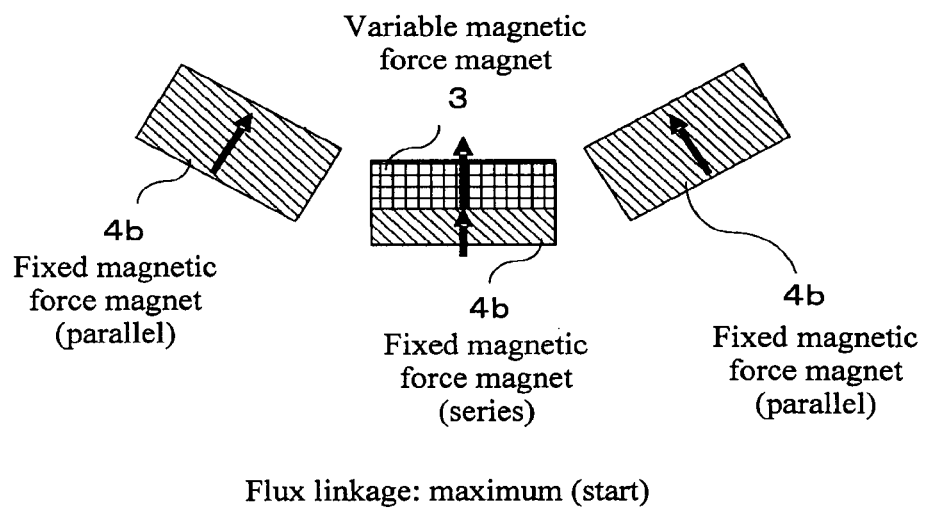
FIG. 2 is a sectional view showing a state in which the flux linkage of the magnets is a maximum level.

FIG. 2 is a view showing a state in which the flux linkage of the magnets is a maximum flux linkage prior to demagnetizing. Here, since the magnetization direction of the two types of layered permanent magnets 3, 4a is the same, this can add up and increase the magnetic flux of the both permanent magnets 3, 4a to bring a maximum magnetic flux.

Figure 3:
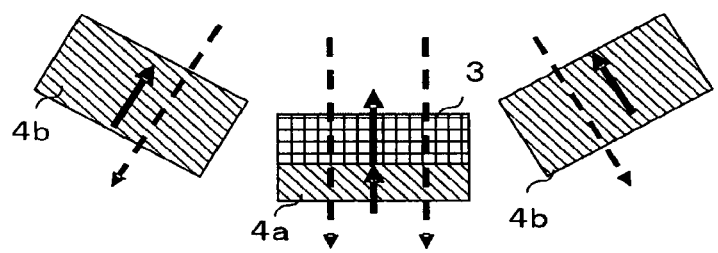
FIG. 3 is a sectional view showing a state in which a current of a coil has generated a magnetic field that reduces the magnetic force of a variable magnetic force magnet.

FIG. 3 shows a state of a demagnetization process, in which using a minus d-axis current that generates a magnetic field in the reverse direction to the magnetization direction of the both permanent magnets 3, 4a, conduction of the current as a pulse-like current that flows through the armature coil is performed. If the magnetic field within the magnet, which has been changed by the minus d-axis current, has reached a value of 175 kA/m, since the coercivity of the variable magnetic force magnet 3 (ferrite magnet) is 175 kA/m, then the magnetic force of the ferrite magnet is irreversibly and significantly reduced. In this state, a magnetic field is applied to the variable magnetic force magnet 3, from the fixed magnetic force magnet 4a, which is layered with the variable magnetic force magnet 3. This magnetic field is offset by the magnetic field that is applied in the d-axis direction for demagnetization, to require a large magnetization current in proportion to the offset amount. However, the magnetization current for demagnetization is less than that for magnetization, to allow a little increase in the magnetization current.

FIG. 4 shows a state in which a reverse magnetic field due to a minus d-axis current has reduced the magnetic force of the variable magnetic force magnet 3. The magnetic force of the variable magnetic force magnet is irreversibly and significantly reduced, but the coercivity of the fixed magnetic force magnet 4a (NdFeB magnet) is 1,500 kA/m, the magnetic force of the fixed magnetic force magnet 4a is not irreversibly reduced. As a result, when a pulse-like d-axis current has reached a value of zero, since only the ferrite magnet has reached a demagnetized state, the flux linkage due to the whole magnets can be quantitatively reduced.

FIG. 5 shows a state in which a reverse magnetic field due to a minus d-axis current has magnetized the variable magnetic force magnet 3 in the reverse direction (the polarity reversed), and the flux linkage of the whole magnets has been reduced to a minimum level. When the minus d-axis current has generated a magnetic field of 350 kA/m, which is required for magnetizing the variable magnetic force magnet 3, the variable magnetic force magnet 3, which was demagnetized, has been magnetized to generate a magnetic force. Here, the magnetization directions of the two types of permanent magnets 3, 4a, which are in the reverse direction each other, subtract and reduce the magnetic flux between the both permanent magnets to bring a minimum magnetic flux.

FIG. 6 shows a state in which a magnetic field has been generated so as to reduce the magnetic force of the variable magnetic force magnet 3 reversed in polarity by the minus d-axis current. Using a plus d-axis current that generates a magnetic field in the same direction as the magnetization direction of the fixed magnetic force magnet 4a, conduction of the current as a pulse-like current that flows through the armature coil is performed. The magnetic field within the magnet, which has been changed by the plus d-axis current, reduces irreversibly and significantly the magnetic force of the variable magnetic force magnet 3 in a state in which the polarity has been reversed. In this state, the fixed magnetic force magnet 4a, which is layered with the variable magnetic force magnet 3, generates a magnetic field to add the magnetic field to the magnetic field generated by the magnetization current (a bias magnetic field from the fixed magnetic force magnet 4a, acts on the variable magnetic force magnet 3), as a result, the variable magnetic force magnet 3 can be readily demagnetized.

Figure 7:
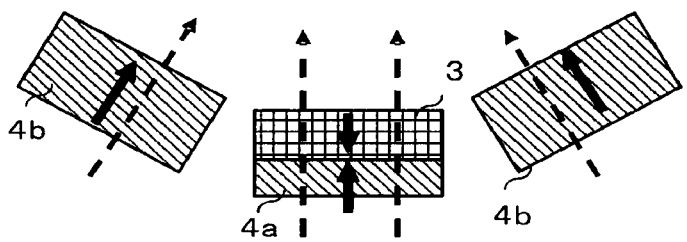
FIG. 7 is a sectional view showing a state in which a magnetic field due to a current has reduced the magnetic force of the variable magnetic force magnet reversed in polarity.

FIG. 7 shows a state in which a magnetic field due to the plus d-axis current has reduced the magnetic force of the variable magnetic force magnet 3 reversed in polarity. A magnetic field due to the fixed magnetic force magnet 4a is also added to the magnetic field due to the plus d-axis current, which reduces irreversibly the magnetic force of the variable magnetic force magnet 3. Therefore, even if a large magnetization current is required in general, in this embodiment, the fixed magnetic force magnet 4a acts such as to prevent increase in the magnetization current.

Figure 8:
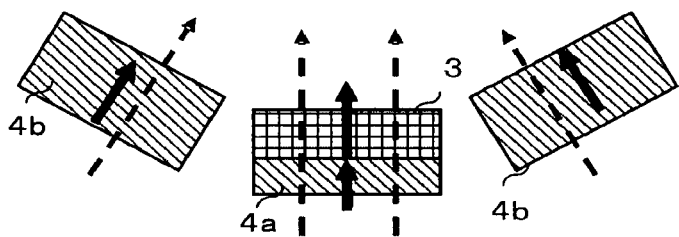
FIG. 8 is a sectional view showing a state in which a reverse magnetic field due to a current has magnetized the variable magnetic force magnet in the reverse direction, and the flux linkage of the magnets is a maximum level.

FIG. 8 shows a state in which a plus d-axis current has magnetized the variable magnetic force magnet 3 in the reverse direction (the polarity reversed again), and the flux linkage of the whole magnets has been increased to a maximum level. The magnetization directions of the two types of layered permanent magnets 3, 4a, are in the same direction, and this can add up and increase the magnetic flux of the both permanent magnets to bring a maximum magnetic flux.

{Action of Variable Magnetic Force Magnet}

Figure 9:
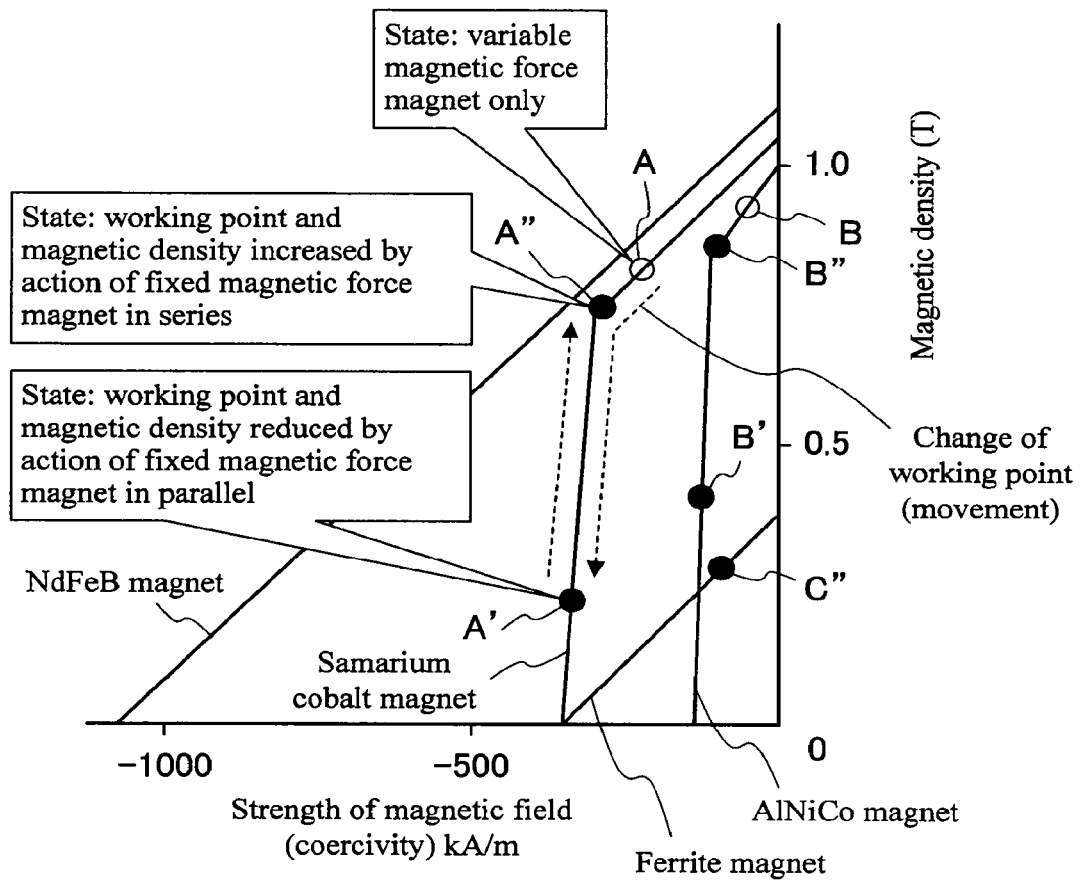
FIG. 9 is a view showing a change of working point of a low coercivity magnet and the magnetic characteristics of typical magnets.

Next, action of the variable magnetic force magnet 3 is explained. FIG. 9 is a graph showing the magnetic characteristics (relation of coercivity and magnetic flux density) of as typical magnets, NdFeB magnet, ferrite magnet, AlNiCo magnet, and samarium cobalt magnet. Among these magnets, as mentioned above, a NdFeB magnet can be used for the fixed magnetic force magnet 4. In addition, the paragraphs in relation to {Configuration} to {Action of series arrangement}, an example in which a ferrite magnet 3 is used for the variable magnetic force magnet 3, but as shown in FIG. 9, not only ferrite magnet and AlNiCo magnet but also samarium cobalt magnet also can be used for the variable magnetic force magnet 3.

The variable magnetic force magnet 3, which has a low coercivity, is at a high magnetic flux density in a state in which there is only the variable magnetic force magnet 3, but when there is a fixed magnetic force magnet 4 arranged in parallel to the magnet, the working point of the variable magnetic force magnet 3 is reduced to reduce the magnetic flux density thereof. On the other hand, when the variable magnetic force magnet 3 and the fixed magnetic force magnet 4a are layered in series, the fixed magnetic force magnet 4a acts such that the working point of the variable magnetic force magnet 3 is increased and the magnetic flux density thereof is increased.

In other words, the working point of AlNiCo magnet and samarium cobalt magnet, which are magnets with a low coercivity and a high magnetic flux density, exists at a high magnetic flux density point (A, B in FIG. 9) when there is only the variable magnetic force magnet 3, but when there are fixed magnetic force magnets 4b, 4b arranged in parallel to the variable magnetic force magnet, the working point of the variable magnetic force magnet 3 is reduced to a low magnetic flux density point (A', B' in FIG. 9). However, in this embodiment, since the variable magnetic force magnet 3 and the fixed magnetic force magnet 4a are layered in series, the directions of magnetic fields are in the reverse direction each other between the fixed magnetic force magnets 4b, 4b arranged in parallel and the fixed magnetic force magnets 4a arranged in series, as a result, the magnetic fields are offset between the both to transfer the working point of the variable magnetic force magnet 3 to a high magnetic flux density point (A", B" in FIG. 9).

As understood from the graph, when an AlNiCo magnet or samarium cobalt magnet is used by itself, for the purpose of reducing the magnetic flux density from the working point A or B, it is required that a magnetic field due to a d-axis current of the armature coil generates the sufficient magnetic force that can overcome the coercivity at the working point, to need a large d-axis current. However, in this embodiment, the use of the fixed magnetic force magnets 4b, 4b arranged in parallel and the fixed magnetic force magnets 4a arranged in series, transfers to the working point of the variable magnetic force magnet 3 to the point A" in FIG. 9. This means that a little change in the strength of the magnetic field allows the magnetic flux density to be reduced sharply. Therefore, when a d-axis current of the armature coil has generated a reverse magnetic field to reduce the magnetic force of the variable magnetic force magnet 3, the magnetic flux density is substantially changed, as a result, a small d-axis current can substantially change the flux linkage due to the whole permanent magnets within the magnetic pole.

Ferrite magnet has a larger coercivity compared with AlNiCo magnet, and requires a large magnetization current when the polarity thereof is reversed in the direction in which the magnetic flux of the permanent magnet is increased. However, in this embodiment, the fixed magnetic force magnet arranged in series acts to allow a small magnetization current to reverse the magnetic force.

This merit is also obtained when the ferrite magnet is used for the variable magnetic force magnet 3. In this case, there is not a sharp change similar to that of AlNiCo magnet or samarium cobalt magnet, but compared with the use of a ferrite magnet by itself, the working point C" is reduced to allow a small d-axis current to reduce the magnetic flux density.

{Action of Magnetic Barrier}

Figure 10:
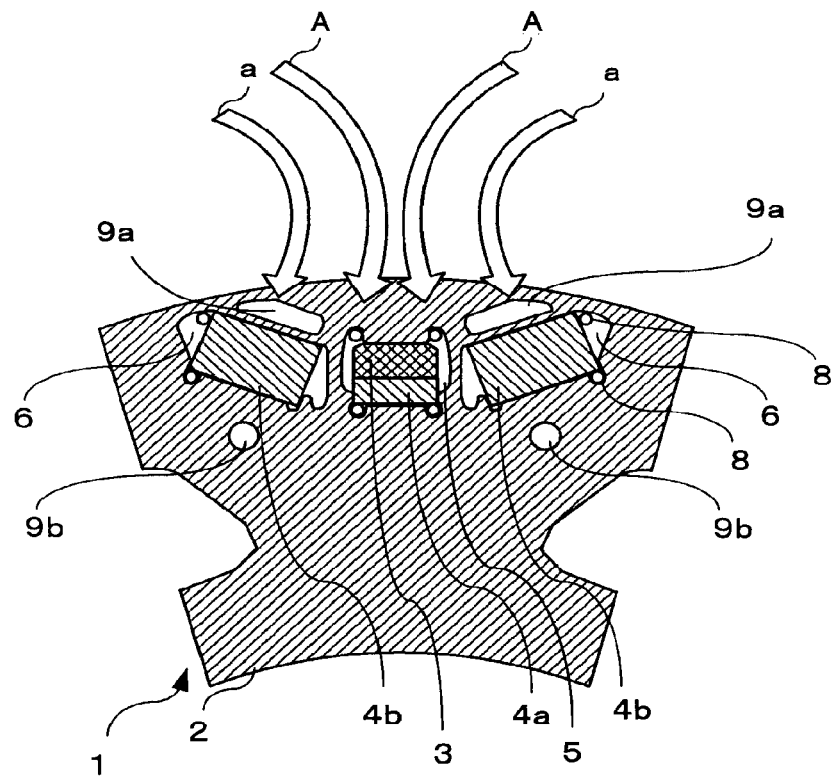
FIG. 10 is a sectional view showing a state during demagnetization of the first embodiment.

Action of a magnetic barrier provided in the outside of the fixed magnetic force magnets 4b, 4b is explained referring to FIG. 10. A cavity 9a serving as magnetic barrier is not provided in the outside of the series of magnets in which the variable magnetic force magnet 3 and the fixed magnetic force magnet 4a are layered, but provided only in the outside of the fixed magnetic force magnets 4b, 4b, which are arranged in parallel to the series of magnets. The magnetic barrier for the fixed magnetic force magnets 4b, 4b, allows a d-axis current to generate a small magnetic field in these parts.

On the other hand, in the periphery of the series of magnets in which the variable magnetic force magnet 3 and the fixed magnetic force magnet 4a are layered, the magnetic barrier is not provided, and this allows a d-axis current to generate a high magnetic field in this part. Therefore, a magnetic field A due to the d-axis current effectively acts on the series of magnets in which the variable magnetic force magnet 3 and the fixed magnetic force magnet 4a are layered. With regard to the magnetic flux increased by the d-axis current, the magnetic flux also can be prevented from increase, which passes through the fixed magnetic force magnets 4b, 4b. As a result, a magnetic saturation in the core can be alleviated, and the d-axis current is reduced, which is used for changing the magnetization of the variable magnetic force magnet 3.

Figure 11:
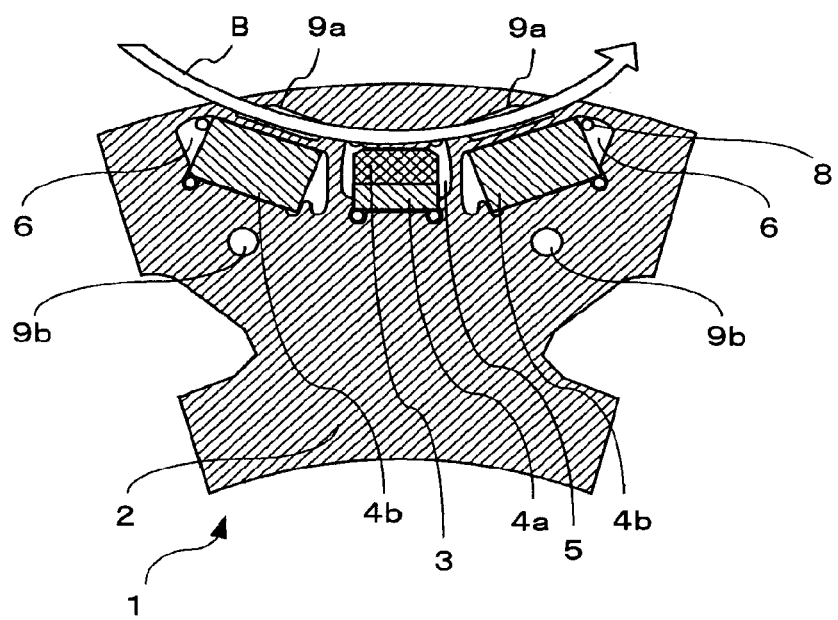
FIG. 11 is a sectional view showing a relation between a magnetic barrier and a q-axis magnetic flux in the invention.

In addition, as shown in FIG. 11, a q-axis magnetic flux B is distributed such that the flux traverses the outer part of the magnetic pole within the rotor core 2, but the cavity 9a as a magnetic barrier reduces the cross-sectional area of the magnetic path to increase the magnetic resistance. Consequently, the inductance of the q-axis can be reduced and the terminal voltage can be reduced.

{Action of Short Circuit Coil}

Figure 12:
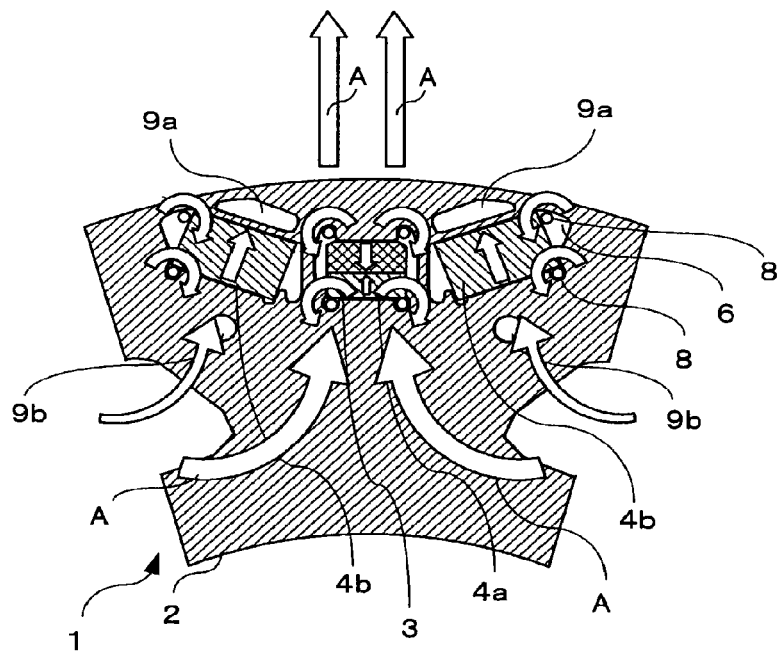
FIG. 12 is a sectional view showing an action of a short-circuit coil in the invention.

Next, action of the short circuit coil 8 is explained referring to FIG. 12. Since the variable magnetic force magnet 3 and the fixed magnetic force magnets 4a, 4b are embedded in the rotor core 2 to configure a magnetic circuit, an above-described magnetic field due to a d-axis current, acts on not only the variable magnetic force magnet 3 but also the fixed magnetic force magnets 4a, 4b. Essentially, the magnetic field due to a d-axis current is generated so as to change the magnetization of the variable magnetic force magnet 3.

So it is preferable to cause the magnetic field due to a d-axis current not to act on the fixed magnetic force magnets 4a, 4b but to be concentrated on the variable magnetic force magnet 3. In this embodiment, short circuit coils 8 are provided on the top side (on the outer side of the rotor) and the bottom side (on the inner side of the rotor) of the fixed magnetic force magnets 4b, 4b. The short circuit coil 8 is arranged such that the central axis of the circuit coil is in the magnetization direction of the fixed magnetic force magnets 4b, 4b. When the magnetic field due to the d-axis current acts on the fixed magnetic force magnets 4b, 4b, then an induced current such as to counteract the magnetic field is allowed to flow through the short circuit coil 8. Consequently, the magnetic field due to the d-axis current and the magnetic field due to a short circuit current act on the fixed magnetic force magnets 4b, 4b to counteract each other in the fixed magnetic force magnets 4b, 4b, as a result, fluctuation of the magnetic fields is generated little or nothing. Further, the magnetic field due to a short circuit current also acts on the variable magnetic force magnet 3 to be in the same direction of the magnetic field due to the d-axis current in the variable magnetic force magnet 3.

Consequently, the magnetic field that magnetizes the variable magnetic force magnet 3 is enhanced to allow a small d-axis current to magnetize the variable magnetic force magnet 3. In addition, with the short circuit coil 8, the fixed magnetic force magnets 4b, 4b are not affected by the d-axis current, and the magnetic flux is increased little or nothing, as a result, a magnetic saturation of the armature core 11 due to the d-axis can be alleviated.

Note that a conductive plate instead of the short circuit coil 8, may be provided on the bottom side (the inner side of the rotor) of the fixed magnetic force magnets 4b, 4b. Preferably, a copper plate or an aluminum plate is used as the conductive plate. In addition, the conductive plate, not limited to the location on the bottom side of the fixed magnetic force magnets, also may be located on the top side of the fixed magnetic force magnets 4b, 4b (the outer side of the rotor). When the conductive plate is located on the top side of the fixed magnetic force magnets 4b, 4b, a merit can be obtained in which current harmonics or slot harmonics generate an induced current in the conductive plate to reduce the harmonics.

In this configuration, when a magnetic field generated by a magnetization current is applied to the conductive plate, an induced current (eddy current) is generated in a surface part of the conductive plate. The induced current of the conductive plate, generates a magnetic field similar to that of the short circuit coil. Consequently, the magnetic field due to the d-axis current and the magnetic field due to a short circuit current act on the fixed magnetic force magnets 4b, 4b to counteract each other in the fixed magnetic force magnets 4b, 4b, as a result, fluctuation of the magnetic fields is generated little or nothing. Further, the magnetic field due to a short circuit current also acts on the variable magnetic force magnet 3 to be in the same direction of the magnetic field due to the d-axis current in the variable magnetic force magnet 3. At the same time, a magnetic saturation of the armature core 11 can be alleviated.

{Action of Air Gap Length}

In the first embodiment, as shown in FIG. 1, the air gap length L1 in the vicinity of the fixed magnetic force magnets 4b, 4b, is larger than the air gap length L2 in the vicinity of the variable magnetic force magnets 3.

In this embodiment, the magnetic field due to the d-axis current, is intended to act on the variable magnetic force magnets 3 and the fixed magnetic force magnets 4a, but a leak magnetic field is also generated. In this embodiment, the air gap length L1 in the vicinity of the q-axis is larger than the air gap length L2 in the vicinity of the d-axis. In other words, the air gap length is short in the vicinity of the variable magnetic force magnets 3 to reduce the magnetic resistance of the air gap part.

Consequently, the magnetic field due to a d-axis current for magnetizing the magnets, is concentrated on As a result, adjustment of the total flux linkage of the permanent magnet can adjust the voltage of the motor over a wide range. In addition, since magnetization is by a pulse-like current in an extremely short time, without constantly and continuously a current for the "flux weakening control", loss can be reduced significantly. In addition, since it is unnecessary to perform the "flux weakening control", no iron loss due to a harmonic flux is generated.

Consequently, with the motor of this embodiment, a variable speed operation can be achieved at a high power output over a wide range of from a low speed to a high speed, and a high efficiency also can be achieved over a wide operation range.

the variable magnetic force magnet 3 and acts as a high magnetic field, to allow a small d-axis current to magnetize the variable magnetic force magnet 3 efficiently. In addition, the magnetic resistance on the q-axis side can be increased to reduce the inductance of the motor and enhance the power factor. In another embodiment, a nonmagnetic part such as to increase the magnetic resistance in the q-axis direction, may be provided in the rotor core, {Advantageous Effect}

This embodiment, which has the above-mentioned configuration and action, has the following effects.

(1) It is possible to prevent increase in a magnetization current when magnetizing a magnet, as a result, without enlarging an inverter for driving the permanent magnet electric motor, an existing inverter can be used as it is to operate the motor efficiently.

(2) A d-axis current allows the variable magnetic force magnet 3 to be irreversibly changed, as a result, the total flux linkage of the magnets, which include the fixed magnetic force magnet 4a and the fixed magnetic force magnets 4b, 4b, can be adjusted over a wide range.

(3) Adjustment of the total flux linkage of the permanent magnets can adjust the voltage of the motor over a wide range. In addition, since magnetization is made by a pulse-like current in an extremely short time, without allowing a current to flow constantly and continuously for the "flux weakening control", loss can be reduced significantly. In addition, since it is unnecessary to perform the "flux weakening control", no iron loss due to a harmonic flux is generated.

Consequently, with the motor of this embodiment, a variable speed operation can be achieved at a high power output over a wide range of from a low speed to a high speed, and a high efficiency also can be achieved over a wide operation range.

(4) With regard to an induced voltage due to the permanent magnet, a minus d-axis current magnetizes the variable magnetic force magnet 3 to reduce the total flux linkage of the permanent magnets. This can prevent damage of an electronic component of an inverter due to the induced voltage of the permanent magnet, to enhance the reliability.

(5) In a state in which the motor is forced to operate with no-load, a minus d-axis current magnetizes the variable magnetic force magnet 3 to reduce the total flux linkage of the permanent magnets. This can reduce the induced voltage remarkably, and it is almost unnecessary to allow a current to flow constantly and continuously for the "flux weakening control" to reduce the induced voltage, to enhance the total efficiency. In particular, when the motor of this invention is equipped and driven in a commuter train in which the inertial running time is long, the total operating efficiency can be enhanced extremely.

{Second Embodiment}

Figure 13:
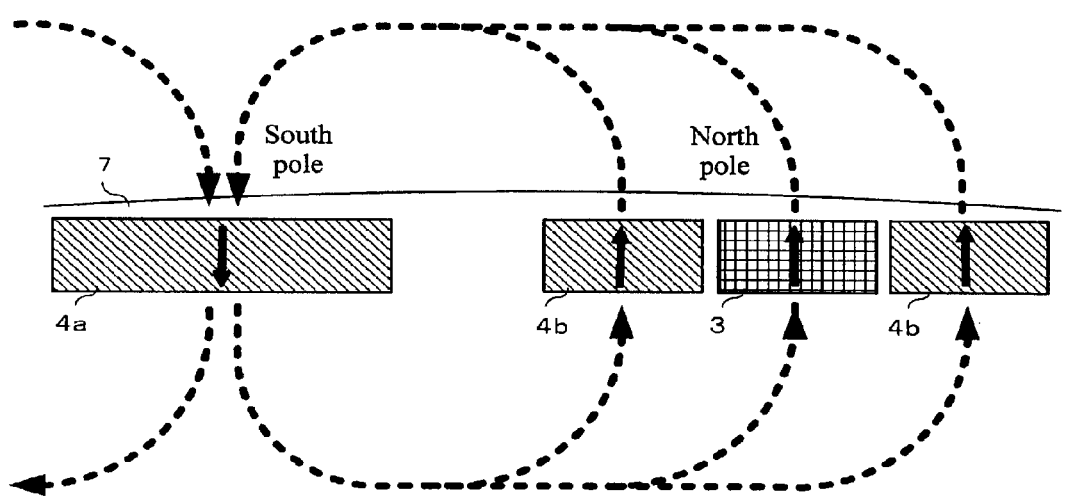
FIG. 13 is a schematic diagram showing a second embodiment of the invention.

A second embodiment of this invention is explained referring to FIG. 13.

In this embodiment, as shown in FIG. 13, a first magnetic pole of the rotor is configured by arranging fixed magnetic force magnets 4b, 4b on either side of a variable magnetic force magnet 3. In addition, a second magnetic pole is configured by arranging a fixed magnetic force magnet 4a adjacent to the first magnetic pole. In these adjoining first and second magnetic poles, the fixed magnetic force magnets 4a, 4b are arranged such that the magnets have different polarities each other in the outer part and inner part of the rotor.

In other words, the magnetic poles of the rotor are configured by the first magnetic pole in which the fixed magnetic force magnets 4b, 4b are arranged on either side of the variable magnetic force magnets 3, and the second magnetic pole, which is arranged on either side of the first magnetic pole and configured by the fixed magnetic force magnet 4a that has a different polarity from the fixed magnetic force magnets 4b, 4b of the first magnetic pole. In addition, in the first magnetic pole, the variable magnetic force magnets 3 and the fixed magnetic force magnets 4b, 4b are arranged in parallel in a magnetic circuit, and the variable magnetic force magnets 3 in the first magnetic pole and the fixed magnetic force magnet 4a in the second magnetic pole are arranged in series in a magnetic circuit to form a series of magnets.

In this embodiment of the above-mentioned configuration, the variable magnetic force magnet 3 is not in series to the fixed magnetic force magnet within one magnet pole of the rotor. However, the variable magnetic force magnet 3 is arranged in series to the fixed magnetic force magnet 4a of the adjoining magnet pole and is influenced by the magnetic field of the fixed magnetic force magnet 4a, the same effect can be obtained as the layers including the fixed magnetic force magnet 4a of the first embodiment. In other words, the direction of the magnetic field of the fixed magnetic force magnet 4a of the adjoining magnetic pole in the rotor, is within the variable magnetic force magnet 3 in the reverse direction to the direction of the magnetic field of the fixed magnetic force magnets 4b, 4b arranged in parallel to the variable magnetic force magnet 3, and the both magnetic fields act on to offset each other. Therefore, when magnetizing the variable magnetic force magnet 3 in a state of irreversibly demagnetized to be restored to the original polarity, the magnetic field due to the adjoining fixed magnetic force magnets 4b, 4b, in which the magnetic field acts to prevent the change of the polarity, can be reduced to reduce the magnetization current (d-axis current) that is required for changing the magnetic force of the variable magnetic force magnet 3.

{Third Embodiment}

Figure 14:
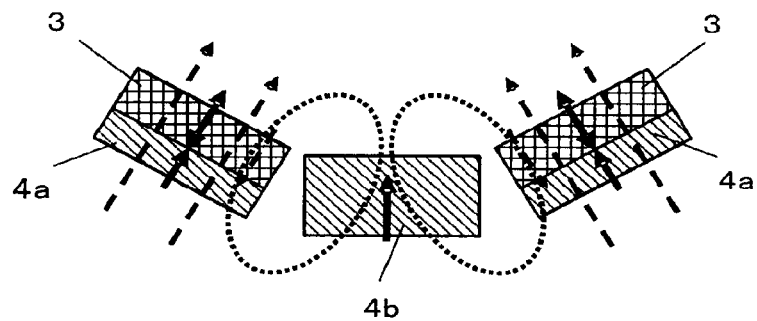
FIG. 14 is a schematic diagram showing a third embodiment of the invention.
Figure 15:
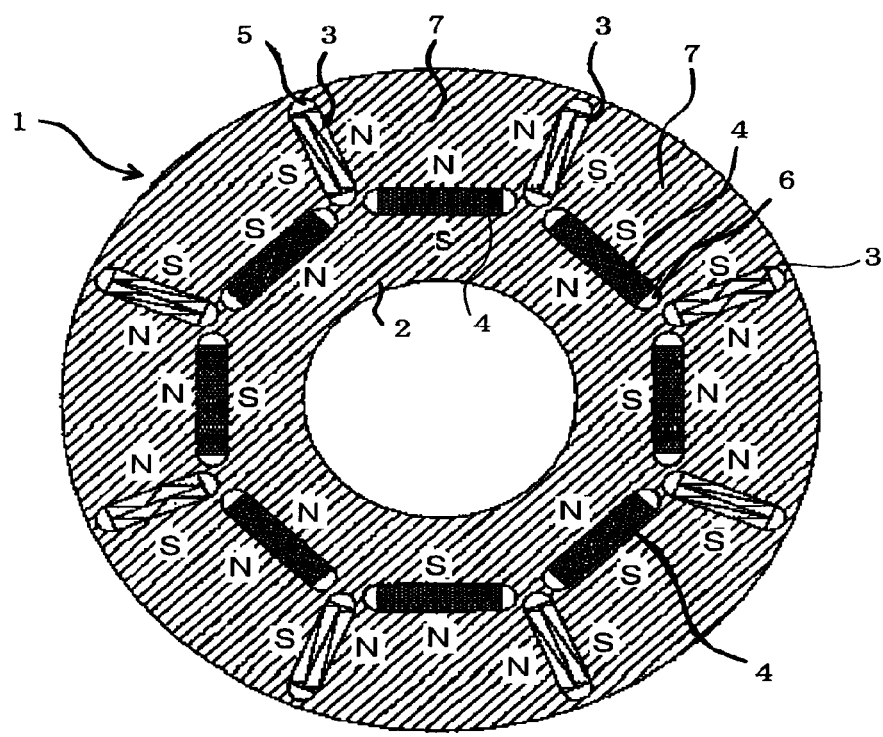
FIG. 15 is a sectional view showing a rotor described in Patent Document 1.

A third embodiment of this invention is explained referring to FIG. 14.

In this embodiment, as shown in FIG. 14, one fixed magnetic force magnet 4b is arranged in the rotor core 2 in a position (the central part of the rotor core) in which the magnetization direction of a fixed magnetic force magnet 4b is in the d-axis direction (here, approximately radial direction of the rotor). In addition, a series of magnets, which is formed by a variable magnetic force magnet 3 and a fixed magnetic force magnet 4a arranged to overlap each other in series, are provided on either side of the fixed magnetic force magnet 4b, in a position in which the magnetization direction is in the d-axis direction. The series of magnets on either side, which are layers of the variable magnetic force magnet 3 and the fixed magnetic force magnet 4a, configure a parallel circuit to the fixed magnetic force magnet 4b provided on the central part of the magnetic pole in a magnetic circuit.

Cavities are provided at the opposite ends of the variable magnetic force magnet 3 and the fixed magnetic force magnets 4a such that a magnetic flux passing through the rotor core 2, passes through the variable magnetic force magnet 3 and the fixed magnetic force magnets 4a in the thickness direction thereof.

In this embodiment of the above-mentioned configuration, in addition to the actions and effects of the first embodiment, the following action and effect can be achieved. The series of magnets, which are the layers including the variable magnetic force magnet 3 and the fixed magnetic force magnets 4a, are provided individually in right and left of the magnetic pole, to allow the variable magnetic force magnet 3 to be magnetized once for each of the right and left. As a result, the fixed magnetic force magnet 4b, which is to prevent the change of the polarity of the variable magnetic force magnet 3, is only one arranged in parallel. In other words, compared with the first embodiment, in which the two fixed magnetic force magnets 4b, the one fixed magnetic force magnet 4b allows the magnetic field, which prevents the change of the polarity of the variable magnetic force magnet 3, to be made smaller, as a result, to reduce the magnetization current (d-axis current) which is required for changing the magnetic force of the variable magnetic force magnet 3.

{Other Embodiments}

This invention is not limited to the above-mentioned embodiments, and may include other embodiments as follows.

(1) In the above-described embodiments, a case of 12 pole motor has been explained, but needless to say, this invention can be similarly applied to various motors having another number of poles such as 4 poles, 8 poles, or 16 poles. Of course the location and shape of permanent magnets may be somewhat changed in accordance with the number of poles, but the same actions and effects as those of the above-described embodiments can be obtained.

(2) In this invention, with relation to permanent magnets for forming a magnetic pole, the definition of the types of permanent magnets is given by the product of the coercivity and the thickness in the magnetization direction. Consequently, even if a magnetic pole is formed by the same type of permanent magnets that have different values as the thickness in the magnetization direction, the same actions and effects as those of the above-described embodiments can be obtained.

(3) In the rotor core 2, the shape and position of the cavity, which is provided so as to form a magnetic barrier outside the fixed magnetic force magnet, and the position of the cavity, which is provided so as to define the cross-sectional area of the magnetic path inside the fixed magnetic force magnet, can be appropriately selected depending on the coercivity of utilized permanent magnets and the strength of a magnetic field generated by a magnetization current or the like.

(4) The motor may be adapted such that, during an operation, a permanent magnet is magnetized by a magnetic field generated by a pulse-like d-axis current in an extremely short time to quantitatively and irreversibly change the magnetic flux thereof, and conduction of a current is continuously performed in which a phase of the current is advanced in relation to an induced voltage of all magnets to quantitatively change the flux linkage of the armature coil generated by the current and the permanent magnet.

In this motor, when reducing the magnetic flux of the permanent magnet by a pulse-like current, subsequently, advancing a current phase, since a magnetic flux directed in the reverse direction of the magnetic flux of the permanent magnet is generated by the current, it is possible to offset the magnetic flux, as a result, the total flux linkage can be reduced and the terminal voltage can be reduced. Note that advancing a current phase is equivalent to allowing a minus d-axis current component to flow.

In such a current phase advance control, advancing a current phase allows a d-axis current to flow to demagnetize the magnet so that the magnetic flux is somewhat reduced. However, extremely demagnetizing by a pulse current, makes a merit of a small reduction ratio in magnetic flux.

(5) In the above-described embodiments, an example employing two types of permanent magnets, which have respectively a large value and a small value as the product of the coercivity and the thickness in the magnetization direction. However, this invention includes an embodiment employing three or more types of permanent magnets, which have different values each other as the product of the coercivity and the thickness in the magnetization direction.

For example, three types of permanent magnets, which have different values each other as the product of the coercivity and the thickness in the magnetization direction, are arranged in series in a magnetic circuit, and a permanent magnet, which has a larger value of the product of the coercivity and the thickness in the magnetization direction than the other types of permanent magnets, is arranged in parallel to the series of magnets in a magnetic circuit. With this example, the same actions and effects as those of the above-described embodiments can be obtained.

The invention claimed is:

1. A permanent magnet electric motor in which a rotor is configured by a rotor core and a plurality of magnetic poles formed inside the rotor core by using two or more types of permanent magnets selected such that the product of the coercivity and the thickness in the magnetization direction of each magnet is different from each other, in which a stator is located outside the rotor with an air gap intervening between them and configured by an armature core and an armature coil, comprising:

when in the two or more types of permanent magnets, one type of permanent magnet has a smaller value as the product of the coercivity and the thickness in the magnetization direction compared with any other type of permanent magnet within the rotor core is called "permanent magnet of small product type", and another type of permanent magnet has a larger value as the product of the coercivity and the thickness in the magnetization direction compared with any other type of permanent magnet within the rotor core is called "permanent magnet of large product type", the plurality of magnetic poles configured by a series of magnets, which is formed by two or more permanent magnets including the two or more types of permanent magnets located in series in a magnetic circuit, and a permanent magnet of the large product type located in parallel to the series of magnets in a magnetic circuit, wherein a permanent magnet of the small product type in permanent magnets forming the series of magnets is magnetized by a magnetic field generated by a current of the armature coil so that the magnetic flux of the permanent magnet configuring the magnetic pole is changed quantitatively and irreversibly.

2. The permanent magnet electric motor according to claim 1, wherein each magnetic pole configuring the plurality of magnetic poles configured by a series of magnets, which is formed by two or more permanent magnets including the two or more types of permanent magnets located in a central part of the pole and in series in a magnetic circuit, and permanent magnet of the large product types as mentioned above located respectively on either pole interval side of the pole and in parallel to the series of magnets in a magnetic circuit, and wherein a permanent magnet of the small product type in permanent magnets forming the series of magnets is magnetized in each magnet pole by a magnetic field generated by a current of the armature coil so that the magnetic flux of the permanent magnet configuring the magnetic pole is changed quantitatively and irreversibly.

3. The permanent magnet electric motor according to claim 1, wherein the plurality of magnetic poles configured by a first magnetic pole and a second magnetic pole which are located alternatively, wherein the first magnetic pole is configured by a permanent magnet of the small product type as mentioned above located in a central part of the pole, and permanent magnet of the large product types as mentioned above located respectively on either pole interval side of the pole and in parallel to the permanent magnet of the small product type of the central part in a magnetic circuit, wherein the second magnetic pole is configured by a permanent magnet of the large product type as mentioned above, such that the permanent magnet of the large product type is located in series to the permanent magnet of the small product type, which is located in the central part of the first pole, in a magnetic circuit, and located in parallel to the permanent magnet of the large product types, which is located respectively on either pole interval side of the first pole, in a magnetic circuit, and wherein the permanent magnet of the small product type located in the central part of the first pole is magnetized by a magnetic field generated by a current of the armature coil so that the magnetic flux of the permanent magnet configuring the magnetic pole is changed quantitatively and irreversibly.

4. The permanent magnet electric motor according to claim 1, wherein each magnetic pole configuring the plurality of magnetic poles configured by two series of magnets, which are formed by two or more permanent magnets including the two or more types of permanent magnets located respectively on either pole interval side of the pole and in series in a magnetic circuit, and a permanent magnet of the large product type as mentioned above located in a central part of the pole and in parallel to the two series of magnets in a magnetic circuit, and wherein a permanent magnet of the small product type in permanent magnets forming the series of magnets is magnetized in each magnet pole by a magnetic field generated by a current of the armature coil so that the magnetic flux of the permanent magnet configuring the magnetic pole is changed quantitatively and irreversibly.

5. The permanent magnet electric motor according to claim 1, wherein the series of magnets is formed by two types of permanent magnets of the small product type and the large product type, which are provided to overlap each other in a magnetic core of the rotor.

6. The permanent magnet electric motor according to claim 1, wherein the permanent magnet, which is located in parallel to other magnets in a magnetic circuit, is arranged in an approximately straight line or a V-shape with the other magnets.

7. The permanent magnet electric motor according to claim 1, wherein the permanent magnets, which are located in parallel each other in a magnetic circuit, are configured by a magnet located approximately on a q-axis at the side of the magnetic pole and a magnet located in a central part of the magnetic pole.

8. The permanent magnet electric motor according to claim 1, wherein a part where magnetic resistance increases, is provided in a magnetic path of the permanent magnet of the large product type.

9. The permanent magnet electric motor according to claim 1, wherein a short-circuit coil is provided in the rotor.

10. The permanent magnet electric motor according to claim 1, wherein the magnetic resistance in a q-axis direction is larger than the magnetic resistance in a d-axis direction except for a magnet part.

11. The permanent magnet electric motor according to claim 1, wherein the length of the air gap in a q-axis direction is larger than the length of the air gap in a d-axis direction.

12. The permanent magnet electric motor according to claim 1, wherein the permanent magnet of the small product type is magnetized by a magnetic field in a predetermined direction generated by a current of the armature coil so that the flux linkage due to a permanent magnet is reduced quantitatively and irreversibly, and wherein, after the reduction of the flux linkage, the permanent magnet of the small product type is magnetized by allowing a magnetic field in the reverse direction to the predetermined direction to be generated by a current so that the flux linkage due to the parmanent magnet is increased quantitatively and irreversibly.

13. The permanent magnet electric motor according to claim 1, wherein a magnetic field generated by a d-axis current magnetizes a permanent magnet to change the magnetic flux of a magnetic quantitatively and irreversibly, to control the torque of the motor by allowing a q-axis current to flow while allowing the d-axis current magnetizing the permanent magnet to flow.

14. The permanent magnet electric motor according to claim 1, wherein during the operation of the motor, a magnetic field generated by a d-axis current magnetizes a permanent magnet to change the magnetic flux of a magnetic quantitatively and irreversibly, to allow the magnetic flux generated by the d-axis current to change the flux linkage of the armature coil generated by current and permanent magnets approximately reversibly.

15. The permanent magnet electric motor according to claim 1, wherein, during the operation at the maximum torque, the permanent magnet of the small product type is magnetized so as to increase the total flux linkage, and during a light loaded operation at a small torque and in a middle-speed rotation range and a high-speed rotation range, the permanent magnet is magnetized so as to reduce the total flux linkage.

16. The permanent magnet electric motor according to claim 1, wherein, when the permanent magnet of the magnetic pole has been changed irreversibly and the flux linkage has been minimum, and when the rotor has reached the maximum rotation speed, an induced voltage generated by the permanent magnet is allowed to be equal to or less than the withstand voltage of an electronic component of an inverter that is a power source of the motor.

17. The permanent magnet electric motor according to claim 1, wherein, when the rotor is inserted to the stator so as to be assembled, the permanent magnet of the small product type is demagnetized or the polarity thereof is reversed so that the flux linkage is reduced quantitatively.

* * * * *